(No Model.)

J. W. SEAVOLT.
DEVICE FOR DEADENING NOISE OF TRAINS.

No. 578,364. Patented Mar. 9, 1897.

Witnesses
F. L. Ourand
K. C. Nau

Inventor
John Wade Seavolt
By John Wedderburn
his Attorney

UNITED STATES PATENT OFFICE.

JOHN WADE SEAVOLT, OF LOCK 53, MARYLAND.

DEVICE FOR DEADENING NOISE OF TRAINS.

SPECIFICATION forming part of Letters Patent No. 578,364, dated March 9, 1897.

Application filed June 18, 1896. Serial No. 596,002. (No model.)

*To all whom it may concern:*

Be it known that I, JOHN WADE SEAVOLT, a citizen of the United States, residing at Lock 53, in the county of Washington and State of Maryland, have invented certain new and useful Improvements in Devices for Deadening Noise of Trains; and I do hereby declare the following to be a full, clear, and exact description of the invention, such as will enable others skilled in the art to which it appertains to make and use the same.

My invention relates to improvements in devices for deadening the sound produced in railway passenger-coaches by the rapid passage thereof over the rails.

The invention consists of the employment of a casing whose top and side pieces are hollow and filled with sawdust or other non-vibrating substance, the top thereof fitting between the floor of the car and the truck, and the sides hinged to the top piece and folding down around the truck.

The invention also consists in other details of construction and combinations of parts, which will be hereinafter more fully described and claimed.

Figure 1:
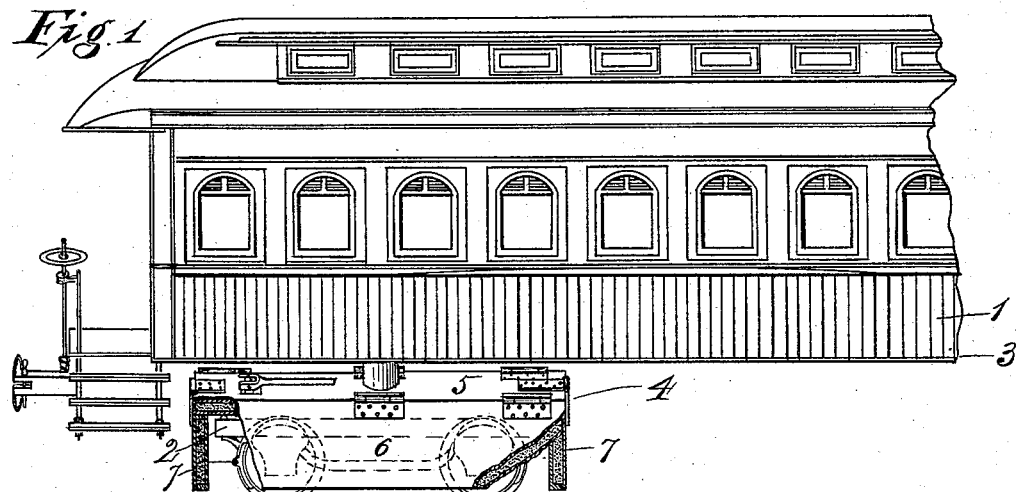
Figure 2:
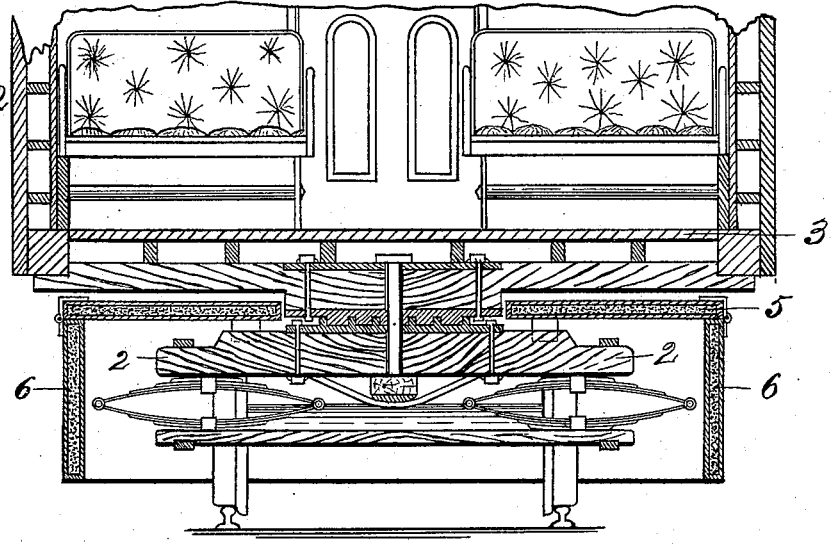
Figure 3:
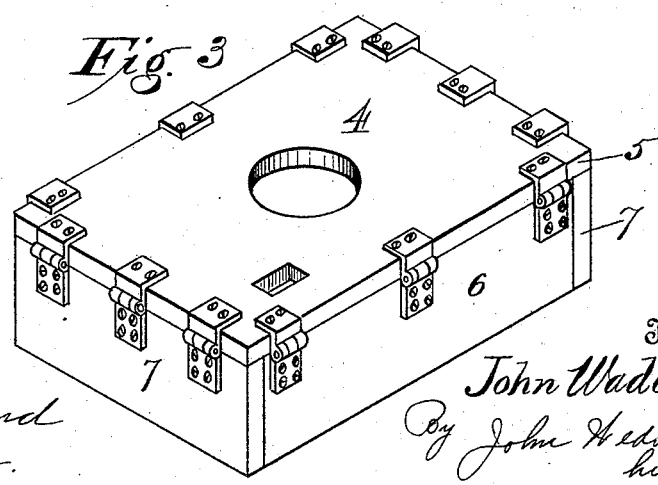

In the drawings forming part of this specification, Figure 1 represents a perspective view of a car with my improvements applied thereto, parts being broken away to show more clearly the interior construction. Fig. 2 is a vertical cross-section through the car and truck. Fig. 3 is a detail perspective view of the casing.

Like reference-numerals indicate like parts in the different views.

The car 1 is of ordinary form of construction, being provided with trucks 2, located beneath the floor 3 of the car. The truck-casing 4 is made up of a top piece 5 and side and end pieces 6 and 7, respectively, which are hinged to the outer edges of said top piece 5. The parts 5, 6, and 7 are each made hollow or double walled, as clearly shown, and the space between the two walls filled with sawdust or other non-vibrating material. The top piece 5 fits over the upper side of the truck 2 beneath the floor 3 of the car, and the side and end pieces 6 and 7 fold down over the sides of said truck. The parts 6 and 7 are hinged to the top piece 5 in order that the operative parts of the truck may be readily reached for purposes of repair or any other desired purpose. By this construction it will be seen that the noise produced by the vibration of the parts of the truck and axle will be taken up or deadened by the interposition of my improved casing between the truck and the floor of the car. The said vibrations and the noise produced thereby will therefore be kept from the passengers in the car.

The device is extremely simple in construction and can be cheaply made and applied to any passenger-car now in use.

Having now described my invention, what I claim as new, and desire to secure by Letters Patent, is—

1. The combination with a car-body and a truck on the under side thereof, of a casing surrounding said truck and interposed between the truck and floor of the car, the said casing having its top side and end pieces made with double walls, with sawdust or other non-vibrating substance inserted between said walls, substantially as and for the purpose described.

2. The combination with a car-body and a truck on the under side thereof, of a casing having top pieces fitting over the upper side of said truck and located beneath the floor of the car, and side and end pieces hinged to said top pieces fitting down around the sides of said truck, the top, side and end pieces of said casing being formed with double walls having sawdust or other non-vibrating material inserted between said walls, substantially as and for the purpose described.

In testimony whereof I have signed this specification in the presence of two subscribing witnesses.

JOHN WADE SEAVOLT.

Witnesses:
W. C. FISHER,
W. R. MENDENHALL.